United States Patent
Li

(10) Patent No.: US 12,484,551 B2
(45) Date of Patent: Dec. 2, 2025

(54) INTELLIGENT STOP-BARKING METHOD, DEVICE AND COMPUTER-READABLE STORAGE MEDIUM

(71) Applicant: SHENZHEN CITY LIAONA TECHNOLOGY CO., LTD, Guangdong (CN)

(72) Inventor: Wenqi Li, Guangdong (CN)

(73) Assignee: SHENZHEN CITY LIAONA TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/172,643

(22) Filed: Apr. 7, 2025

(65) Prior Publication Data

US 2025/0311702 A1    Oct. 9, 2025

(30) Foreign Application Priority Data

Apr. 8, 2024   (CN) .......................... 202410416710.6

(51) Int. Cl.
    *A01K 15/02*       (2006.01)
    *G06N 3/0464*     (2023.01)

(52) U.S. Cl.
    CPC ......... *A01K 15/022* (2013.01); *G06N 3/0464* (2023.01)

(58) Field of Classification Search
    CPC ........................... A01K 15/022; G06N 3/0464
    See application file for complete search history.

(56) References Cited

U.S. PATENT DOCUMENTS

| | | | | |
|---|---|---|---|---|
| 10,806,126 | B1* | 10/2020 | Loewke | ............... A01K 15/022 |
| 2018/0249680 | A1* | 9/2018 | Van Curen | ........... A01K 15/022 |
| 2020/0372918 | A1* | 11/2020 | Padawer | ............. G10L 15/1822 |
| 2020/0390063 | A1* | 12/2020 | Li | ......................... A01K 27/009 |
| 2021/0190581 | A1* | 6/2021 | Qiu | ......................... G01H 11/02 |
| 2021/0219524 | A1* | 7/2021 | So | ............................ H04R 1/08 |

FOREIGN PATENT DOCUMENTS

| | | | | |
|---|---|---|---|---|
| CN | 108157219 | A | * 6/2018 | .......... A01K 15/022 |
| CN | 218585201 | U | * 3/2023 | |

\* cited by examiner

*Primary Examiner* — Dhaval V Patel

(57) ABSTRACT

The present invention discloses an intelligent stop-barking method, device, and computer-readable storage medium. The method runs on an embedded terminal worn by a pet. The embedded terminal is built in with a preset pet barking model. The method includes: sound collection: obtaining a decibel value of ambient sound of the pet's surrounding environment; model comparison: if the decibel value of the sound is greater than a preset decibel value, then the sound collected is compared with the pet barking model and a comparison result is output; and output punishment: if the comparison result is greater than a preset punishment value, then the punishment module is triggered to stop the pet from barking. The technical solution, through machine learning models and signal processing techniques, enables high-accuracy dog barking sound recognition. It reduces reliance on powerful computing resources, and achieves stand-alone operation of data model, thereby improving feasibility and popularization.

8 Claims, 1 Drawing Sheet

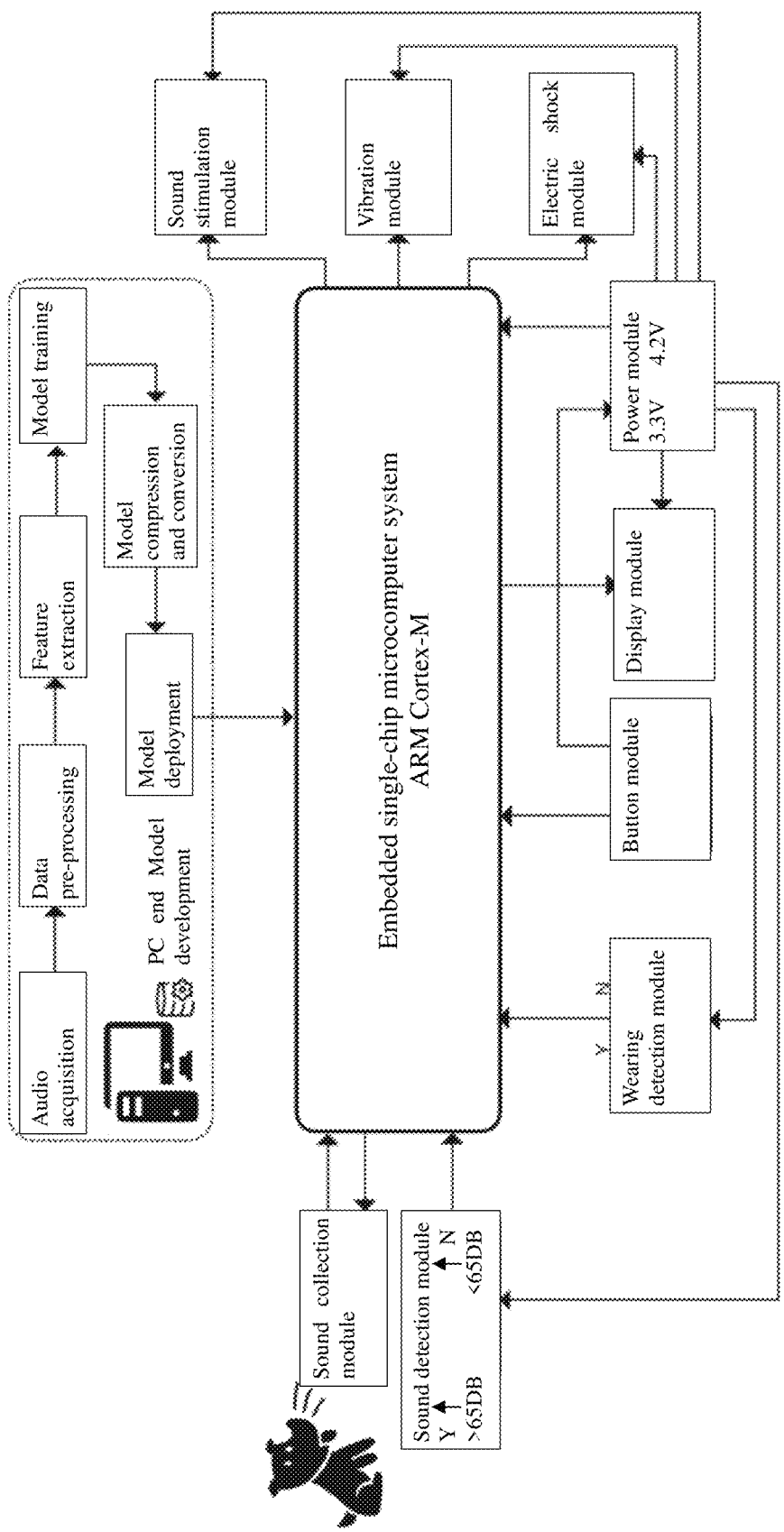

INTELLIGENT STOP-BARKING METHOD, DEVICE AND COMPUTER-READABLE STORAGE MEDIUM

CROSS REFERENCE TO RELATED APPLICATIONS

The present application claims the benefit of Chinese Patent Application No. 202410416710.6 filed on Apr. 8, 2024, the contents of which are incorporated herein by reference in their entirety.

TECHNICAL FIELD

The present invention relates to the field of stop-barking devices, and in particular to an intelligent stop-barking method, device and computer-readable storage medium.

BACKGROUND TECHNOLOGY

As pet dogs are common in urban communities, frequent or long-term barking of pet dogs has become a major problem affecting people's daily routines. At present, stop-barking devices worn on pets have appeared on the market, which calm the barking by performing disciplinary actions. However, these existing stop-barking devices are all for identifying pet barking, i.e., they are simply based on the sound or the loudness of the sound as the basis for determination. This traditional sound recognition system often cannot truly identify whether it is a real dog barking. They can only simply determine whether there is a high-decibel sound, which is extremely easy to cause the device to make a wrong determination and execute a wrong punishment, thereby causing the pet to overreact and endanger the safety of the pet.

SUMMARY OF THE INVENTION

In order to overcome the shortcomings of the prior art, the embodiments of the present invention provide an intelligent stop-barking method, device, and computer-readable storage medium.

An intelligent stop-barking method, which is run in an embedded terminal worn on a pet, wherein a preset pet barking model is built in the embedded terminal. A punishment module is also provided in the embedded terminal, and the punishment module is configured to stimulate the pet and stop the pet from barking. The intelligent stop-barking method includes the following steps:

S1, sound collection: obtaining a decibel value of ambient sound of the pet's surrounding environment;

S2, model comparison: if the decibel value of the sound is greater than a preset decibel value, then the sound collected is compared with the pet barking model and a comparison result is output; and S3, output punishment: if the comparison result is greater than a preset punishment value, then the punishment module is triggered.

An intelligent stop-barking device, which includes the embedded terminal used in the above-mentioned intelligent stop-barking method. The embedded terminal includes:

a sound collection and detection module, the sound collection and detection module is configured to collect ambient sound of the pet's surrounding environment, and, after an ADC conversion, input it to the intelligent stop-barking model for comparison;

a punishment module, the punishment module includes any one or more of an electric shock module, a vibration module, and a sound stimulation module;

a power module, the power module comprises a charging circuit and a voltage regulating circuit; the charging circuit is configured to charge a lithium battery inside the embedded terminal, and the voltage regulating circuit is configured to provide a regulated voltage to the embedded terminal;

a display module, the display module is configured to display a working status of the embedded terminal; and a button module, the button module comprises a power button, a mode button and an intensity button; the power button is configured to control power on and off of the embedded terminal, the mode button is configured to select a current punishment module, and the intensity button is configured to control intensity levels of the punishment module.

A computer-readable storage medium, which stores a computer program. The computer program, when executed by a processor, implements the steps of the above-mentioned intelligent stop-barking method.

The above-mentioned intelligent stop-barking method, device, and computer-readable storage medium provide a technical solution for accurately identifying dog barking sounds through optimized machine learning models and signal processing technologies on resource-constrained embedded single-chip microcomputer systems. Compared with the prior art, the real dog barking sound can be identified in the scene of non-single dog barking sound, and whether it is the barking sound of the dog wearing the intelligent stop-barking device can be identified. It can assist in analyzing the current environmental noise volume and analyzing whether there is a dog barking sound, reduce wrong judgment and punishment caused by inaccurate identification, and avoid causing excessive reactions of pets. In addition, the device reduces the dependence on powerful computing resources, reduces the overall system cost, and improves the feasibility and popularity in practical applications. The device truly breaks away from the connection between the PC or cloud and the embedded single-chip microcomputer system, thereby realizing stand-alone operation of the data model.

DESCRIPTION OF THE DRAWING

In order to more clearly illustrate the technical solution of the embodiments of the present invention, the drawing required to be used in the description of the embodiments of the present invention will be briefly introduced below. Obviously, the drawing in the following description covers only some embodiments of the present invention. For ordinary technicians in this field, other drawings can also be obtained based on this drawing without contributing creative labor.

The sole FIGURE is a framework diagram of the intelligent stop-barking method and device according to an embodiment of the present invention.

SPECIFIC EMBODIMENTS

The following will combine the drawing of the embodiments of the present invention to clearly and completely describe the technical solutions in the embodiments of the present invention. Obviously, the described embodiments are parts of the embodiments of the present invention, not all of the embodiments. Based on the embodiments in the present invention, all other embodiments obtained by ordinary technicians in this field without creative work are within the scope of protection of the present invention.

In one embodiment, as shown in the sole FIGURE, an intelligent stop-barking method and an intelligent stop-barking device are provided. The intelligent stop-barking device includes an embedded terminal worn on a pet, and a PC or cloud for creating an intelligent barking model. Among them, the intelligent stop-barking method runs on the embedded terminal, i.e., an embedded single-chip microcomputer system.

Specifically, the embedded single-chip microcomputer system adopts the ARM Cortex-M, including:

Sound collection module: collecting external sounds, converting them through ADC, and inputting them into an in8 model for reasoning comparison.

Wearing detection module: detecting whether the device is worn on the neck of the pet dog. If it is worn correctly, a Y signal is sent, and if it is not worn correctly, an N signal is sent.

Sound detection module: detecting the volume of ambient noise, and the judgment limit is 65 DB (i.e., a preset decibel value). When it is greater than 65 DB, a Y signal is sent to perform the next step of output punishment. When it is less than 65 DB, an N signal is sent.

Display module: displaying the current working status, such as power on, power off, current mode, etc.

Power module: consisting of a charging circuit and a voltage regulating circuit, which respectively charge the lithium battery inside the device and provide a regulated voltage to the entire system of the device.

Punishment module: configured to stimulate the pet and stop the pet from barking. It includes any one or more of an electric shock module, a vibration module, and a sound stimulation module. Among them, the electric shock module is configured to generate an electrostatic shock upon receiving a drive command; the vibration module is configured to generate a vibration prompt upon receiving the drive command; and the sound stimulation module is configured to generate a sound or ultrasonic prompt upon receiving the drive command, and its frequency range is 1.25 KHZ-30 KHZ.

Button module: includes a power button, a mode button, and an intensity button, which respectively control power on and off of the device, the working mode (i.e., an output punishment method), and the intensity levels in this mode.

The intelligent stop-barking method mainly includes the steps shown in the sole FIGURE:

S1, sound collection: obtaining a decibel value of an ambient sound of the pet's surrounding environment;

S2, model comparison: if the decibel value of the sound is greater than a preset decibel value, such as 65 DB, then the sound collected is compared with a pet barking model and the comparison result is output; and S3, output punishment: if the comparison result is greater than a preset punishment value, then the punishment module is triggered.

Specifically, the workflow of the embedded terminal is as follows:

When a corresponding power button in the button module is pressed, a power-on command is transmitted to the power module to start a system regulated power supply, and the regulated voltage is 3.3V. When the regulated 3.3V voltage flows to the ARM Cortex-M and is powered on, the ARM Cortex-M initializes and starts, and is ready to complete the power-on action. When the power button is pressed again, a shutdown command will be sent to the ARM Cortex-M, and the ARM Cortex-M sends a shutdown command to the power module to turn off the power of the entire system.

After normal startup, the wearing detection module automatically detects whether the device is worn on the pet's neck. If it is worn correctly, a working command is sent to the ARM Cortex-M, and then a power switch is turned on to power on the sound collection and detection module, and the device starts working. If it is not worn correctly, a shutdown command is sent to the ARM Cortex-M, and the power of the whole device is turned off by default after 30 seconds, and the default shutdown time can be flexibly set in advance.

The mode button of the button module is configured to adjust the working mode of the device to sound stimulation mode, vibration mode, or electric shock mode. The working level intensity of each of the above three modules can be set by the intensity button in the button module. At the same time, the current working mode, working level intensity, power information, etc. can be displayed through the display module, so as to more intuitively understand the current working status of the device and make corresponding adjustments in time.

The sound collection and detection module is in working state. When there is a dog barking outside, it will detect whether the current sound decibel value is greater than 65 DB. If it is greater than 65 DB, a command is sent to the ARM Cortex-M, and the ARM Cortex-M module will compare the input sound signal with the preset intelligent barking model and output a comparison result. The comparison result is compared with the preset punishment value to trigger the punishment module. The preset punishment value is 0.9. When the comparison result is greater than or equal to 0.9, the dog barking sound is recognized. At this time, a corresponding trigger command is output according to the current working mode setting to give the three warning modules to execute the corresponding warning or punishment:

1) When the comparison result is >0.9, the ARM Cortex-M sends a trigger sound warning command to the sound stimulation module to execute a buzzer alarm, and the alarm sound frequency will increase with the increase in the number of triggers, and the frequency range is 1.25K-30 KHZ. The execution intensity is based on the settings after the system is turned on.
2) When the comparison result is >0.9, the ARM Cortex-M sends a trigger vibration warning command to the vibration module to execute a vibration alert. The execution intensity is based on the settings after the system is turned on.
3) When the comparison result is >0.9, the ARM Cortex-M sends a trigger electric shock warning command to the electric shock module to execute an electrostatic pulse shock punishment. The execution intensity is based on the settings after the system is turned on.
4) When the comparison result is <0.9, the ARM Cortex-M does not perform any action, and will continue to analyze and calculate the next sound electrical signal and output a comparison result.

The intelligent stop-barking device also includes a PC terminal or cloud terminal, which is configured to create the pet barking model. Specifically, it includes the following steps:

S01, audio acquisition: recording audio of various barking sounds of dogs and background sounds in various occasions using a high-definition recording equipment.

S02, pre-processing of data: converting the collected audio of the barking sounds and the background sounds into WAV format with a sampling rate of 16 Khz, by performing a clip for 1 second, noise reduction, and dynamic range compression; labeling the barking sounds as dog and labeling the noise as noise, and the data is classified into a training set, a verification set, and a test set.

S03, feature extraction: Mel Frequency Energy (MFE) is used as a feature to extract the feature of the sound signal. Since the audio to be extracted is dog barking, MFE is particularly suitable for feature extraction of non-human voice, so that MFE is more conducive to subsequent deployment of the obtained intelligent barking model on the embedded single-chip microcomputer system for real-time recognition in some real-time computing or resource-constrained applications.

S04, model training: building a convolutional neural network using Keras, and training the feature-extracted data using TensorFlow to obtain the pet barking model. Among them, first a model is built, a CNN model is built; then the training data labeled as dog and noise is used to train the model. At the same time, validation data is used to monitor the performance during the training process to avoid overfitting.

S05, model evaluation: evaluating the model performance using the test set, and understanding the performance of the model on new and unseen data. Based on the model's performance, layers can be added or removed, and parameters such as the number of neurons can be adjusted to obtain a model with optimal performance.

S06, result output: establishing a visual result output for the prediction of new data. The visual result output includes tables and distribution graphs, and has a byte output format with a value range of 0.0000-1. For example, after inputting the sample, if the result after sound comparison is 1 (greater than 0.9, 0.9 is an approximate value of the visual result output), it is determined as a dog barking.

Furthermore, in the S03 feature extraction step, the feature extraction process is as follows:

S031, pre-emphasis, improving the signal strength of the high-frequency part by the following formula:

$$y(n) = x(n) - ax(n-1)$$

where x(n) is an original signal, y(n) is a pre-emphasized signal, α is a pre-emphasis coefficient, greater than or equal to 0.9;

S032, framing and window function: framing the pre-emphasized signal, and applying a window function, such as a Hamming window, to each frame to reduce signal discontinuity at the frame boundary;

S033, Fast Fourier Transform: applying Fast Fourier Transform (FFT) to each frame to obtain a spectrum of the signal, and applying FFT to each frame of the signal x(n) to obtain the spectrum X(k), where k is a frequency index;

S034, Mel filter bank: applying a set of Mel filter banks to the FFT result. Each filter is mapped to a specific frequency region on the Mel scale to simulate the auditory characteristics of the human ear. Each filter covers a characteristic. The relationship between the Mel frequency $f_{mel}$ and the actual frequency f is expressed by the following formula:

$$f_{mel} = 2595 \log_{10}\left(1 + \frac{f}{700}\right)$$

S035, energy calculation: calculating the energy of each Mel filter output, Mel Frequency Energy (MFE) directly uses these energy values as features without further logarithmic transformation or Discrete Cosine Transform (DCT). The output energy $E_m$ of each filter is calculated by summing the squares of the filter outputs, the formula is as follows:

$$E_m = \sum_{k} |X(k) \cdot H_m(k)|^2$$

where $E_m$ is the output energy of the $m^{th}$ filter, X(k) is the spectrum obtained by the Fast Fourier Transform, $H_m(k)$ is a frequency response of the $m^{th}$ Mel filter, and the sum is performed on all frequencies k covered by the filter.

Furthermore, after obtaining the intelligent barking model, the process of compressing, converting and deploying the model to the embedded terminal is also included, specifically including:

S07, model compression and conversion: quantizing the pet barking model, compressing and converting the pet barking model into a dataset running on the embedded terminal. Quantization is a technology to reduce the size of the model, which is achieved by reducing the precision of the numerical values in the model, so that the model is more suitable for running on a resource-constrained embedded single-chip microcomputer system, for example, based on the conversion of a TensorFlow model to a TensorFlow Lite model.

S08, model deployment: converting the dataset into a C language array format, and downloading it to the embedded terminal. That is, in order to be able to use the converted in8 model on the embedded single-chip microcomputer system, the model file needs to be converted into a C array format. For example, xxd tool of a TensorFlow Lite Micro is used to implement it. The converted C array is included in the embedded single-chip microcomputer system code, so that the model data can be directly accessed.

In one embodiment, a computer-readable storage medium is provided, on which a computer program is stored. When the computer program is executed by a processor, the intelligent stop-barking method in the above method embodiment is implemented. To avoid repetition, it is not repeated here.

The intelligent stop-barking method, device, and computer-readable storage medium provided by the present invention can realize high-accuracy dog barking recognition on an embedded single-chip microcomputer system with limited resources through optimized machine learning models and signal processing technology. At the same time, it reduces the dependence on powerful computing resources and reduces system costs. It is truly separated from the connection between the PC or cloud and the embedded single-chip microcomputer system. It realizes stand-alone operation of the data model, thereby improving the feasibility and popularity in practical applications.

The above-mentioned embodiments are only used to illustrate the technical solutions of the present invention, rather than to limit them. Although the present invention is described in detail with reference to the above-mentioned embodiments, ordinary technicians in this field should understand that they can still modify the technical solutions disclosed in the above-mentioned embodiments, or replace some of the technical features therein with equivalents.

However, these modifications or replacements do not make the essence of the corresponding technical solutions deviate from the spirit and scope of the technical solutions of the embodiments of the present invention, and should be included in the scope of protection of the present invention.

What is claimed is:

1. An intelligent stop-barking method, being run in an embedded terminal worn on a pet, wherein a preset pet barking model is built in the embedded terminal; a punishment module is also provided in the embedded terminal, and the punishment module is configured to stimulate the pet and stop the pet from barking; the intelligent stop-barking method comprises the following steps:

S1, sound collection: obtaining a decibel value of ambient sound of the pet's surrounding environment;

S2, model comparison: if the decibel value of the sound is greater than a preset decibel value, then the sound collected is compared with the pet barking model and a comparison result is output; and S3, output punishment: if the comparison result is greater than a preset punishment value, then the punishment module is triggered;

the embedded terminal comprises:

a sound collection and detection module, the sound collection and detection module is configured to collect ambient sound of the pet's surrounding environment, and, after an ADC conversion, input it to the intelligent stop-barking model for comparison;

a punishment module, the punishment module includes any one or more of an electric shock module, a vibration module, and a sound stimulation module;

a power module, the power module comprises a charging circuit and a voltage regulating circuit; the charging circuit is configured to charge a lithium battery inside the embedded terminal, and the voltage regulating circuit is configured to provide a regulated voltage to the embedded terminal;

a display module, the display module is configured to display a working status of the embedded terminal; and a button module, the button module comprises a power button, a mode button and an intensity button; the power button is configured to control power on and off of the embedded terminal, the mode button is configured to select a current punishment module, and the intensity button is configured to control intensity levels of the punishment module;

the method further comprises:

creating, by a PC terminal or cloud terminal, the pet barking model, and creating of the pet barking model comprises the following steps:

S01, audio acquisition: recording audio of various barking sounds of dogs and various background sounds using a high-definition recording equipment;

S02, pre-processing of data: converting the barking sounds and the background sounds into a WAV format file with a preset sampling rate, by performing a clip with a preset duration, noise reduction, and dynamic range compression; dividing the barking sounds and the background sounds into different sound labels, and classifying them into a training set, a verification set, and a test set;

S03, feature extraction: performing feature extraction on the pre-processed data using Mel Frequency Energy;

S04, model training: building a convolutional neural network using Keras, and training the feature-extracted data using TensorFlow to obtain the pet barking model;

S05, model evaluation: evaluating performance of the pet barking model using the test set, obtaining the pet barking model's performance on new and unseen data, adding or removing layers to or from the pet barking model, and adjusting parameters of the pet barking model; and S06, result output: establishing a visual result output for each input sample.

2. The intelligent stop-barking method as claimed in claim 1, wherein the electric shock module is configured to generate an electrostatic shock upon receiving a drive command; the vibration module is configured to generate a vibration prompt upon receiving the drive command; and the sound stimulation module is configured to generate a sound or ultrasonic prompt upon receiving the drive command, and a frequency range generated by the sound stimulation module is 1.25 KHZ-30 KHZ.

3. The intelligent stop-barking method as claimed in claim 1, wherein before S1, the method further comprises:

S0, wearing detection: performing automatic detection after the embedded terminal is turned on, if it is detected that the embedded terminal is worn on the pet, then enter S1; if it is not detected that the embedded terminal is correctly worn on the pet, the embedded terminal will automatically shut down after a preset time.

4. An intelligent stop-barking device, comprising an embedded terminal worn on a pet, wherein a preset pet barking model is built in the embedded terminal; a punishment module is also provided in the embedded terminal, and the punishment module is configured to stimulate the pet and stop the pet from barking; the embedded terminal is used to run an intelligent stop-barking method comprising the following steps:

S1, sound collection: obtaining a decibel value of ambient sound of the pet's surrounding environment;

S2, model comparison: if the decibel value of the sound is greater than a preset decibel value, then the sound collected is compared with the pet barking model and a comparison result is output; and S3, output punishment: if the comparison result is greater than a preset punishment value, then the punishment module is triggered, the embedded terminal comprises:

a sound collection and detection module, the sound collection and detection module is configured to collect ambient sound of the pet's surrounding environment, and, after an ADC conversion, input it to the intelligent stop-barking model for comparison;

a punishment module, the punishment module includes any one or more of an electric shock module, a vibration module, and a sound stimulation module;

a power module, the power module comprises a charging circuit and a voltage regulating circuit; the charging circuit is configured to charge a lithium battery inside the embedded terminal, and the voltage regulating circuit is configured to provide a regulated voltage to the embedded terminal;

a display module, the display module is configured to display a working status of the embedded terminal; and a button module, the button module comprises a power button, a mode button and an intensity button; the power button is configured to control power on and off of the embedded terminal, the mode button is configured to select a current punishment module, and the intensity button is configured to control intensity levels of the punishment module;

wherein the device further comprises a PC terminal or cloud terminal, and the PC terminal or cloud terminal is configured to create the pet barking model, and creating of the pet barking model comprises the following steps:

S01, audio acquisition: recording audio of various barking sounds of dogs and various background sounds using a high-definition recording equipment;

S02, pre-processing of data: converting the barking sounds and the background sounds into a WAV format file with a preset sampling rate, by performing a clip with a preset duration, noise reduction, and dynamic range compression; dividing the barking sounds and the background sounds into different sound labels, and classifying them into a training set, a verification set, and a test set;

S03, feature extraction: performing feature extraction on the pre-processed data using Mel Frequency Energy;

S04, model training: building a convolutional neural network using Keras, and training the feature-extracted data using TensorFlow to obtain the pet barking model;

S05, model evaluation: evaluating performance of the pet barking model using the test set, obtaining the pet barking model's performance on new and unseen data, adding or removing layers to or from the pet barking model, and adjusting parameters of the pet barking model; and S06, result output: establishing a visual result output for each input sample.

5. The intelligent stop-barking device as claimed in claim 4, wherein the embedded terminal further comprises:

a wearing detection module for detecting whether the intelligent stop-barking device is correctly worn on the pet's neck.

6. The intelligent stop-barking device as claimed in claim 4, wherein after S04, the method further comprises:

S07, model compression and conversion: quantizing the pet barking model, compressing and converting the pet barking model into a dataset running on the embedded terminal; and S08, model deployment: converting the dataset into a C language array format and downloading it to the embedded terminal.

7. The intelligent stop-barking device as claimed in claim 4, wherein the feature extraction further comprises:

S031, pre-emphasis: increasing signal strength of a high-frequency part by the following formula:

$$y(n) = x(n) - ax(n-1)$$

where, x(n) is an original signal, y(n) is a pre-emphasized signal, α is a pre-emphasis coefficient, which is greater than or equal to 0.9;

S032, framing and window function: framing the pre-emphasized signal, and applying window function to each frame;

S033, Fast Fourier Transform: applying Fast Fourier Transform to each frame to obtain a spectrum of the signal, and obtaining spectrum X(k) for each frame of the signal x(n), where k is a frequency index;

S034, Mel filter bank: applying a set of Mel filter banks to a result of the Fast Fourier Transform, where each filter is mapped to a specific frequency region on a Mel scale; each filter covers a specific frequency range; relationship between a Mel frequency $f_{mel}$ and an actual frequency f is expressed by the following formula:

$$f_{mel} = 2595 \log_{10}\left(1 + \frac{f}{700}\right)$$

S035, energy calculation: calculating energy output of each Mel filter, output energy $E_m$ of each filter is calculated by summing squares of filter outputs, a formula is as follows:

$$E_m = \sum_k |X(k) \cdot H_m(k)|^2$$

where, $E_m$ is output energy of the $m^{th}$ filter, X(k) is a spectrum obtained by the Fast Fourier Transform, $H_m(k)$ is a frequency response of the $m^{th}$ Mel filter, and a summation is performed on all frequencies k covered by the filter.

8. A non-transitory computer-readable storage medium, the non-transitory computer-readable storage medium storing a computer program, wherein the computer program, when executed by a processor, implements the steps of the intelligent stop-barking method as claimed in claim 1.

* * * * *